United States Patent [19]

Minato et al.

[11] Patent Number: 4,463,642
[45] Date of Patent: Aug. 7, 1984

[54] SHEARING MACHINE

[75] Inventors: Yoshiharu Minato; Chuo Tobita, both of Isehara, Japan

[73] Assignee: Amada Company, Limited, Kanagawa, Japan

[21] Appl. No.: 382,230

[22] Filed: May 26, 1982

[30] Foreign Application Priority Data

May 26, 1981 [JP] Japan .............................. 56-75195[U]
May 28, 1981 [JP] Japan .............................. 56-76595[U]

[51] Int. Cl.$^3$ ............................................ B23D 15/12
[52] U.S. Cl. ........................................ 83/530; 83/622; 83/632; 83/640
[58] Field of Search ................. 83/640, 620, 622, 530, 83/529, 628, 632, 602

[56] References Cited

U.S. PATENT DOCUMENTS

| | | | |
|---|---|---|---|
| 2,303,760 | 12/1942 | Rafter | 83/530 |
| 2,605,836 | 8/1952 | Messick | 83/640 |
| 2,645,287 | 7/1953 | Munschauer | 83/640 X |
| 3,033,055 | 5/1962 | Hähnel | 83/632 X |
| 3,282,141 | 11/1966 | Gautron | 83/640 X |
| 3,616,719 | 11/1971 | Tassie . | |
| 3,893,361 | 7/1975 | Harris | 83/622 X |
| 3,942,400 | 3/1976 | Roch | 83/622 X |
| 3,968,714 | 7/1976 | Kuchyt | 83/640 X |
| 4,241,631 | 12/1980 | Salvatore | 83/632 X |
| 4,354,411 | 10/1982 | Griese et al. | 83/530 X |

FOREIGN PATENT DOCUMENTS 263279 12/1926 United Kingdom .

Primary Examiner—Frank T. Yost
Attorney, Agent, or Firm—Armstrong, Nikaido, Marmelstein & Kubovcik

[57] ABSTRACT

A shearing machine is disclosed which includes a first lower blade and a second lower blade positioned at right angles with respect to each other. A ram is provided which is swingably movable upwardly and downwardly with respect to the lower blades, the ram including a first upper blade and a second upper blade positioned at right angles with respect to each other. A drive drives the ram upward and downward with respect to the lower blades and connecting rods couple the drive to the ram. An adjusting mechanism is coupled to the ram and the connecting rods for adjusting the lower limit of the stroke of the ram. Furthermore, the machine includes adjustors for adjusting the horizontal clearance between the upper and lower blades when the ram is in its lowered position.

8 Claims, 5 Drawing Figures

SHEARING MACHINE

BACKGROUND OF THE INVENTION

1. Field of the Invention

The present invention generally relates to a shearing machine having a movable upper blade and a fixed lower blade for cutting or shearing sheet-like workpieces such as sheet metals, and more particularly the present invention pertains to the adjustments of the stroke of the upper blade and the horizontal clearance between the upper and lower blades.

2. Description of the Prior Art

As is well-know, shearing machines for cutting or shearing sheet-like workpieces such as sheet metals are provided with an elongated movable upper blade carried by a ram member and an elongated fixed lower blade which is fixedly provided under the upper blade to cooperate therewith. The ram member carrying the upper blade is so arranged as to be mechanically or hydraulically moved up and down to bring the upper blade into and out of engagement with the lower blade to cut or shear the workpieces. Generally, the ram member can be driven at a higher speed in the mechanically operated shearing machines than in the hydraulically operated shearing machines. Also, the ram member is moved straight up and down in what is called a guillotine-type shearing machine, and it is swung up and down around a pivot means in what is called a swing-type shearing machine. Generally, the swing-type shearing machines can be manufactured and assembled at lower costs than the guillotine-type shearing machines. Also, in order to cut or shear square-shaped blanks out of large sheet-like workpieces, there are shearing machines which are provided with L-shaped or right-angled upper and lower blades.

In shearing machines, a workpiece smaller in width than the length of the upper and lower blade can be cut or sheared by a single stroke of the upper blade to the lower blade. However, in order to slit a workpiece larger in width than the length of the upper and lower blades, it is necessary to continuously repeat the strokes of the upper blade to the lower blade with the workpiece being fed or moved little by little along the cutting edges of the upper and lower blades. Also, in order to slit wider workpieces in this manner, it is necessary to make an adjustment to set the lower limit of the stroke of the upper blade higher than in an ordinary shearing operation. Heretofore, there have been hydraulically operated shearing machines in which the adjustment can be made to change the lower limit of the stroke of the upper blade, but there have been no mechanically operated shearing machines in which the adjustment can be made for such purpose. Also, in the conventional hydraulically operated shearing machines, not only can the adjustment of the stroke of the upper blade not be accurately made, but also the ram member cannot be operated at higher speeds as described in the above.

In order to accurately shear the sheet-like workpieces in the shearing machines, it is further necessary to adjust the horizontal clearance between the upper and lower blades depending upon the thicknesses of the workpieces to be sheared. The clearance between the upper and lower blades is adjusted in various ways in the conventional shearing machines, but heretofore there have been no satisfactory clearance adjusting means for shearing machines having L-shaped or right-angled upper and lower blades. For instance, the clearance between the upper and lower blades is adjusted by tilting the ram member (as disclosed in U.S. Pat. No. 3,282,141), but the clearance adjusting device is complex, expensive and inconvenient.

SUMMARY OF THE INVENTION

It is an object of the present invention to provide a shearing machine in which the lower limit of the stroke of the upper blade can be accurately adjusted to slit a workpiece larger in width than the lengths of the upper and lower blades.

It is another object of the present invention to provide an adjusting means for adjusting the lower limit of the stroke of the upper blade to the lower blade in a mechanically operated shearing machine in which the ram member can be driven at high speed.

It is a further object of the present invention to provide a shearing machine having L-shaped or right-angled upper and lower blades in which the horizontal clearance between the upper and lower blades can be easily adjusted depending upon the thicknesses of workpieces to be sheared.

It is a further object of the present invention to provide an adjusting means for adjusting the horizontal clearance between the L-shaped or right-angled upper and lower blades in a swing-type shearing machine which can be manufactured and assembled at a lower cost.

It is a still further object of the present invention to provide a simple and low-cost adjusting means for adjusting the clearance between the upper and lower blades in a shearing machine.

According to the present invention, briefly the lower limit of the stroke of the upper blade to the lower blade is adjusted by an adjustable cam member which is rotatably provided on a connecting rod connecting the ram member with a driving means. More particularly, the connecting rod is rotatably connected at one end thereof to an eccentric shaft driven by the driving means and is connected at the other end to the ram by means of the eccentric cam member. Also, according to the present invention, the ram member carrying the upper blade is kept horizontally biased away from the lower blade by an elastic means such as a spring and is so arranged as to be horizontally moved by a lead screw means against or by the elastic means.

Other and further objects and advantages of the present invention will be apparent from the following description and accompanying drawings which, by way of illustration, show preferred embodiments of the present invention and the principle thereof.

DESCRIPTION OF THE PREFERRED EMBODIMENTS

Figure 1:
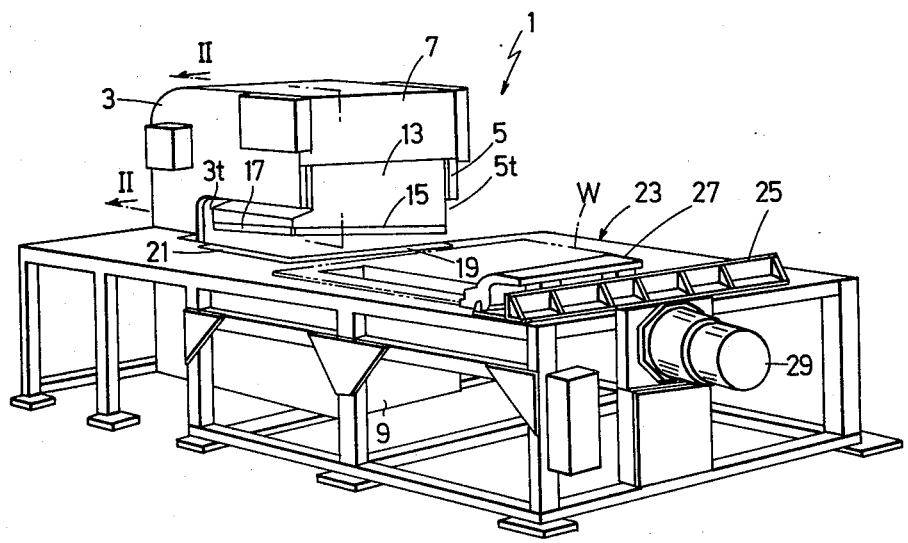
FIG. 1 is a perspective view of a shearing machine embodying the principles of the present invention.

Referring now to FIG. 1, there is shown a shearing machine 1 which emboides the principles of the present invention as an example. The shearing machine 1 comprises a pair of C-shaped upright plates 3 and 5 which are formed at their midway portions with throats 3t and 5t, respectively, and are connected with each other by a upper front plate 7, a lower front plate 9 and rear plate 11 shown in FIG. 4 to from a box-like frame. Particularly, the upright plates 3 and 5 are disposed in parallel with each other, and the upper and lower front plates 7 and 9 are fixed to the upper and lower portions, respectively, of the forward ends of the upright plates 3 and 5 at right angles therewith. Also, the throats 3t and 5t of the upright plates 3 and 5 are horizontally formed on a level with each other in such a manner as to extend in parallel with each other and open forwardly about the top of the lower front plate 9.

The shearing machine 1 is provided with a ram 13 carrying an elongated upper front blade 15 and an elongated upper side blade 17, and it is also provided with an elongated lower front blade 19 and an elongated lower side blade 21. As will be described in great detail hereinafter, the ram 13 is so disposed as to be moved up and down between the upright plates 3 and 5 behind the front upper plate 7 to move the upper front and side blades 15 and 17 up and down. The upper front blade 15 is detachably fixed to the forward bottom end of the ram 13 in parallel with the upper front plate 7, and the upper side blade 17 is detachably fixed to the side of the ram 13 in parallel with the upright plate 5. More specifically, the upper front and side blades 15 and 17 are fixed to the ram 13 in such a manner to be integrally connected with each other at a right angle to work as a single L-shaped blade. On the other hand, the lower front blade 19 is detachably and horizontally fixed to the top of the lower front plate 9, and the lower side blade 21 is detachably and horizontally fixed to the throat 5t of the upright plate 5 on a level with the lower front blade 19. In the same manner as the upper front and side blades 15 and 17, the lower front and side blades 19 and 21 are integrally connected with each other so as to work as a single L-shaped blade. Of course, the arrangement is such that the upper front and side blades 15 and 17 will be brought by the ram 13 integrally simultaneously into engagement with the lower front and side blades 19 and 21 to cooperate therewith to make a shearing action when the ram 13 is lowered. Also, as seen from FIGS. 1 and 3, the cutting edges of the upper front and side blades 15 and 17 are disposed to be tilted or oblique at an angle (shear angle) to the lower front and side blades 19 and 21, respectively.

As is shown also in FIG. 1, the shearing machine 1 is provided with a work-table 23 on which a sheet-like workpiece W to be sheared such as a sheet metal is placed to be fed into between the upper front and side blades 15 and 17 and the lower front and side blades 19 and 21 into the throats 3t and 5t of the upright plates 3 and 5. The work-table 23 is so constructed that its top surface is substantially on a level with the top of the lower front and side blades 19 and 21. In order to feed and position the workpiece W to be sheared, the work-table 23 is provided with a first carriage 25 horizontally movable and a second carriage 27 slidably mounted on the first carriage 25 to carry the workpiece W. The first carriage 25 is so arranged as to be horizontally moved by a motor 29 on the work-table 23 toward and away from the lower front and side blades 19 and 21, while the second carriage 27 is so arranged as to be horizontally moved to the right and left by a motor (not shown) on the first carriage 25. Thus, it will be understood that the workpiece W placed on the work-table 23 and held by the second carriage 27 can be fed and positioned anywhere onto the lower front and side blades 19 and 21 by moving the first and second carriages 25 and 27.

In the above described arrangement, the workpiece W can be sheared when it has been positioned onto the lower front and side blades 19 and 21 by the first and second carriages 25 and 27 and the ram 13 is lowered to enable the upper front and side blades 15 and 17 to cooperate with the lower front and side blades 19 and 21. As is readily understood, the workpiece W can be sheared straight when it is positioned on either of the lower front and side blades 19 and 21, and also it can be sheared into a L-shaped configuration when positioned on both of them. Also, even if the workpiece W is larger in width than the length of the front blades 15 and 19 which are generally longer than the side blades 17 and 21, it can be sheared or slit on a straight line if it is fed little by little along the front blades 15 and 19 for instance with the ram 13 continuously stroked. In order to straightly slit the workpiece W in this manner, the lower limit of the stroke of the upper front blade 15 with respect to the lower front blade 19 can be adjusted to be set higher according to the present invention, as will be described in great detail hereinafter.

Figure 2:
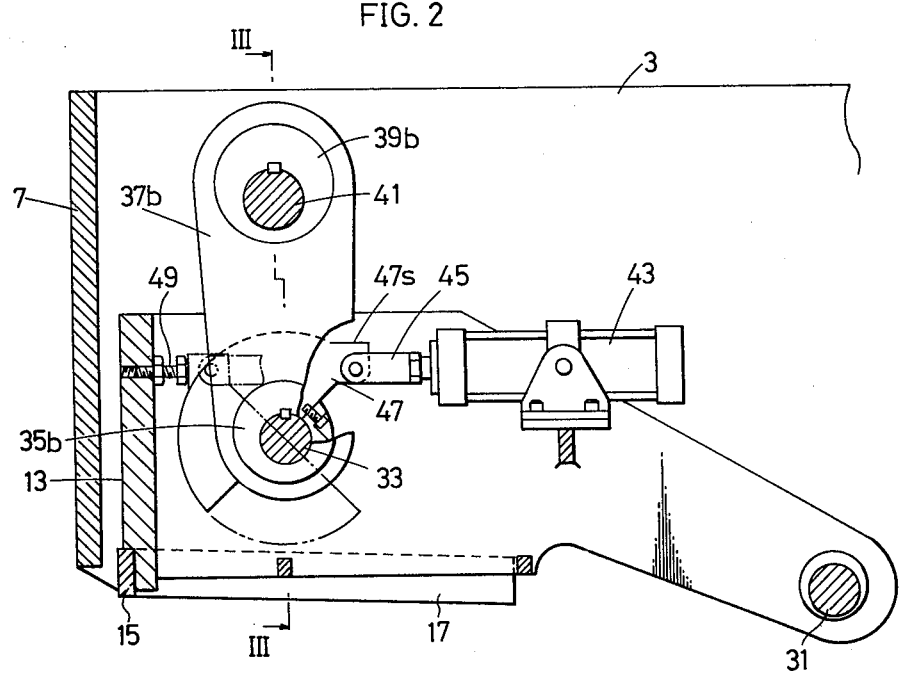
FIG. 2 is an enlarged sectional view taken along the line II—II of FIG. 1.
Figure 4:
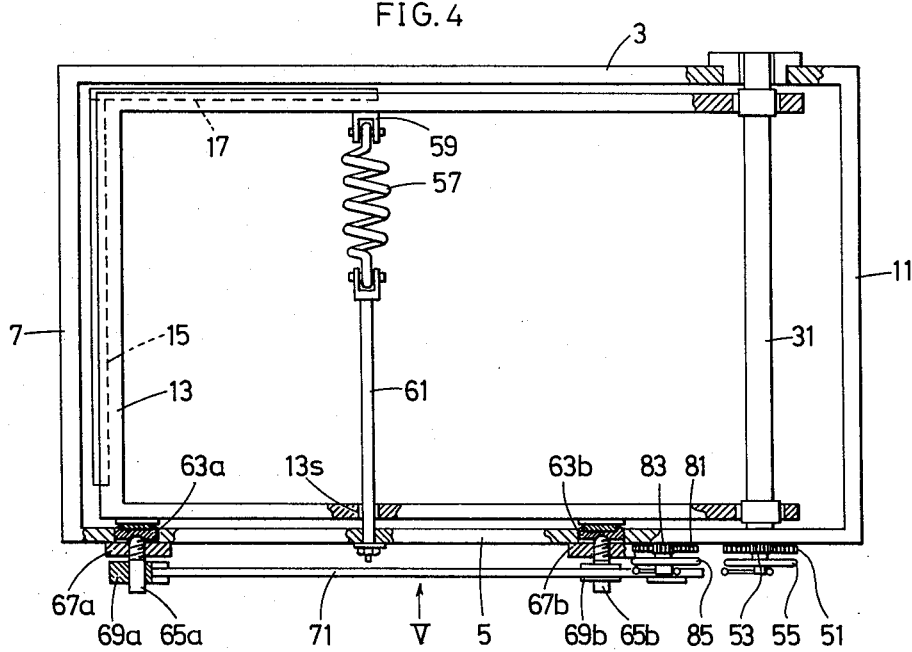
FIG. 4 is a partially schematic plan view.
Figure 5:
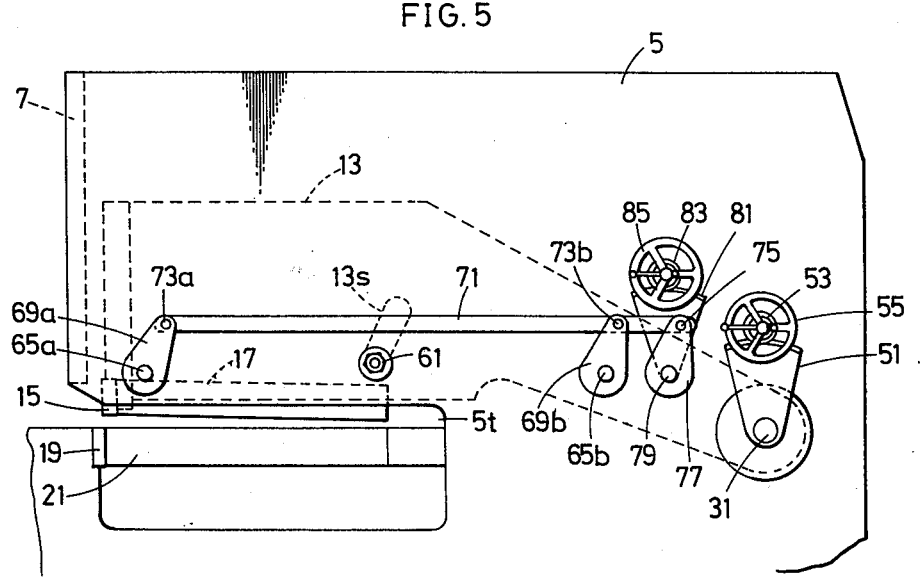
FIG. 5 is a side elevational view of the shearing machine taken in the direction of the arrow V of FIG. 4.

As seen from FIGS. 2, 4 and 5, the ram 13 is pivotally held on an eccentric shaft 31 between the upright plates 3 and 5 so that it may be swung up and down around the eccentric shaft 31 to move the upper front and side blades 15 and 17 up and down. The eccentric shaft 31 holding the ram 13 is horizontally and rotatably held between the rear portions of the upright plates 3 and 5 in such a manner that it is normally prevented from rotating, but can be rotated, if desired. As will be described in detail hereinafter, the eccentric shaft 31 is arranged to be rotated to adjust the horizontal clearance between the upper front blade 15 and the lower front blade 19 according to the thickness of the workpiece W to be sheared.

Figure 3:
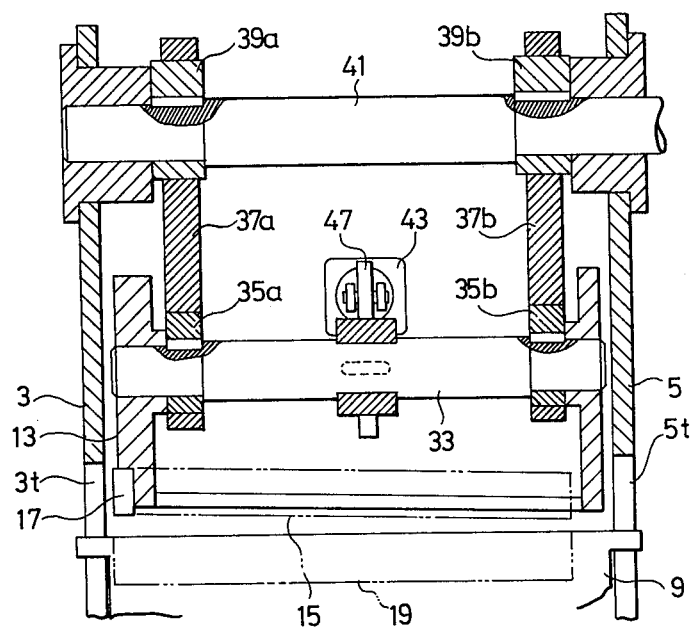
FIG. 3 is a sectional view taken along the line III—III of FIG. 2.

As shown in FIGS. 2 and 3, in order to swing the ram 13 around the eccentric shaft 31, a shaft 33 having a pair of eccentrics 35a and 35b integrally fixed thereto, is horizontally and rotatably connected to the ram 13, and a pair of connecting rods 37a and 37b are rotatably connected to the eccentrics 35a and 35b. Also, the connecting rods 37a and 37b are rotatably connected to a pair of eccentrics 39a and 39b, respectively, which are integrally fixed to a driving shaft 41 which is rotatably held between the upright plates 3 and 5 which is driven by a driving means (not shown). Thus, when the driving shaft 41 is rotated together with the eccentrics 39a and 39b, the connecting rods 37a and 37b will be reciprocated by the eccentrics 39a and 39b to swing the ram 13 around the eccentric shaft 31 by means of the eccentrics 35a and 35b and the shaft 33 to move the upper front and side blades 15 and 17 up and down. Also, as will be further described immediately hereinafter, the lower limit of the stroke of the upper front and side blades 15 and 17 can be adjusted by rotating the shaft 33 to rotate the eccentrics 35a and 35b in the connecting rods 37a and 37b.

Referring further to FIGS. 2 and 3, there is provided a hydraulic motor 43 having a piston rod 45 to rotate the eccentrices 35a and 35b in the connecting rods 37a and 37b so as to adjust the lower limit of the stroke of the upper front and side blades 15 and 17. The hydraulic motor 43 is pivotally mounted on a portion of the ram 13 by a trunnion arrangement, and the piston rod 45 of the hydraulic motor 43 is connected to a lever member 47 which is semicircular in the preferred embodiment and is fixed to the shaft 33. The arrangement is such that the piston rod 45 of the hydraulic motor 43, when extended, will rotate the shaft 33 in the ram 13 by means of the lever member 47 to rotate the eccentrics 35a and 35b in the connecting rods 37a and 37b. Also, the eccentrics 35a and 35b are so designed as to raise the shaft 33 and the lower ends of the connecting rods 37a and 37b by their eccentricity in an aslant upward direction when rotated by the piston rod 45 of the hydraulic motor 43. Thus, it will now be understood that the rotation of the eccentrics 35a and 35b will raise the lower end of the stroke of the ram 13 and the upper front and side blade 15 and 17 by the eccentricity, although the stroke length of the connecting rods 37a and 37b is fixed by the eccentricity of the eccentrics 39a and 39b of the driving shaft 41.

In the above described arrangement, the upper front blade 15 can be brought into engagement with the lower front blade 19 to produce a shearing action even when the lower limit of the stroke of the ram 13 and the upper front blade 15 is raised by the eccentricity of the eccentrics 35a and 35b, since the shearing edge of the upper front blade 15 is formed to be oblique at the shear angle to the lower front blade 19. Also, the upper side blade 17 can be arranged so that it will not be brought into engagement with the lower side blade 21 by the ram 13 when the eccentrics 35a and 35b have raised the upper limit of the stroke of the ram 13. Thus, shearing actions can be effected only by the upper and lower front blades 15 and 19 when the eccentrics 35a and 35b have been rotated in the connecting rods 37a and 37b by the piston rod 35 of the hydraulic motor 43 to keep the lower limit of the stroke of the ram 13 raised. In this arrangement, it is possible to shear straightly or slit the workpiece W which is larger in width than the length of the upper and lower front blades 15 and 19 by feeding the workpiece W little by little along the cutting edges of the front blades 15 and 19 continuously stroking the ram 13 at the raised position.

Referring again to FIG. 2, in order to minutely or finely adjust the lower limit of the stroke of the ram 13 and the upper front blade 15, an adjust screw 49 is provided on a portion of the ram 13 and a stop portion 47s is formed on the lever member 47. The arrangement is such that the stop portion 47s of the lever member 47 will be brought into contact with the adjustment screw 49 when the piston rod 45 of the hydraulic motor 43 is extended as shown in imaginary lines in FIG. 2. In this arrangement, the extension of the piston rod 45 of the hydraulic motor 43 can be adjusted by adjusting the adjust screw 49 so as to adjust the rotation of the shaft 33 and the eccentrics 35a and 35b. Thus, it will be understood that the lower limit of the stroke of the ram 13 and the upper front blade 15 can be easily and minutely or finely adjusted by adjusting the adjustment screw 49.

Referring to FIGS. 4 and 5, in order to adjust the horizontal clearance between the upper and lower front blades 15 and 19, the eccentric shaft 31 holding the ram 13 is provided at its end with a sector gear 51 which is in engagement with a gear 53 coaxially connected to a handwheel 55. In the preferred embodiment, the eccentric shaft 31 is disposed to rotatably project out of the upright plate 5, and the sector gear 51 is secured to the projecting end of the eccentric shaft 31 in engagement with the gear 53 connected to the handwheel 55 which is rotatably provided at the outside of the upright plate 5. Thus, when the handwheel 55 is manually rotated, the eccentric shaft 31 will be rotated in the upright plates 3 and 5 by the handwheel 55 through the gear 53 and the sector gear 51. In this connection, the handwheel 55 is usually kept locked in a well-known manner to prevent the eccentric shaft 31 from rotating. Thus, it will be now understood that the horizontal clearance between the upper and lower front blades 15 and 19 can be easily adjusted using the eccentricity of the eccentric shaft 31 by rotating the handwheel 55 to rotate the eccentric shaft 31, according to the thickness of the workpiece W to be sheared.

Referring further to FIGS. 4 and 5, in order to adjust the horizontal clearance between the upper and lower side blades 17 and 21, the ram 13 is so disposed as to be slightly slidably on the eccentric shaft 31 toward and away from the lower side blade 21 or the upright plate 3 and it is biased by a spring 57 away from the lower side blade 21. In the preferred embodiment, the spring 57 is connected between a bracket 59 fixed to a portion of the ram 13 and a rod member 61 which is secured to the upright plate 5 through an arcuate slot 13s formed through the ram 13. In order to move the ram 13 toward and away from the lower side blade 21, a plurality of slide blocks 63a and 63b are secured to the side of the ram 13 near the upright plate 5, and lead screws 65a and 65b are rotatably disposed on the upright plate 5 in contact with the slide blocks 63a and 63b.

More particularly, the lead screw 65a and 65b are rotatably held in nut members 67a and 67b secured to the upright plate 5 so that they can move the ram 13 against and with the spring 57 toward and away from the lower side blade 21 when rotated. Also, the lead screws 65a and 65b are disposed to project out of the upright plate 5 and are integrally fixed to lever members 69a and 69b which are pivotally connected to a rod member 71 by means of pins 73a and 73b. Thus, the lead screws 65a and 65b can be rotated by the lever members 69a and 69b to move the ram 13 toward and away from the lower side blade 21 when the rod member 71 is moved to rotate or swing the lever members 69a and 69b.

In order to rotate or swing the lever members 69a and 69b, the rod member 71 is pivotally connected by means of a pin 75 to another lever member 77 integrally fixed to a shaft 79 which is rotatably mounted on the outside of the upright plate 5. The shaft 79 is provided with a sector gear 81 which is in engagement with a gear 83 coaxially connected to a handwheel 85 so that the shaft 79 can be rotated or swung together with the sector gear 81 by the handwheel 85 through the gear 83. Also, the handwheel 85 is rotatably provided on the outside of the upright plate 5 in a manner such that it is usually kept locked in a well-known manner.

In the above described arrangement, when the handwheel 85 is manually rotated to rotate the shaft 79 by means of the gear 83 and the sector gear 81, the rod member 71 will be moved by the lever member 77 to rotate or swing the lever members 69a and 69b to rotate the lead screws 65a and 65b. Thus, it will be now understood that the horizontal clearance between the upper and lower side blades 17 and 21 can be easily adjusted by rotating the handwheel 85 to rotate the lead screws 65a and 65b to move the ram 13 so as to move the upper side blade 17 toward and away from the lower side blade 21.

Although a preferred form of the present invention has been illustrated and described, it should be understood that the device is capable of modification by one skilled in the art without departing from the principles of the invention. Accordingly, the scope of the invention is to be limited only by the claim appended hereto.

We claim:

1. A shearing machine comprising:
   (a) a first lower blade and a second lower blade, positioned at a right angle with respect to each other;
   (b) a ram means swingably movable upwardly and downwardly with respect to said lower blades, said ram means including a first upper blade and a second upper blade positioned at a right angle with respect to each other;
   (c) driving means for driving said ram means upward and downward with respect to said lower blades;
   (d) connecting rod means coupling said driving means to said ram means; and
   (e) adjusting means coupled to said ram means and said connecting rod means for adjusting the lower limit of the stroke of said ram means, wherein said adjusting means includes adjusting screw means for finely adjusting the lower limit of said ram means.

2. A shearing machine as set forth in claim 1 wherein said driving means includes a rotatable eccentric shaft, said connecting rods being mounted thereon.

3. A shearing machine as set forth in claims 1 wherein said ram means includes a shaft and wherein said adjusting means includes eccentric members mounted between said shaft and said connecting rod means.

4. A shearing machine comprising:
   (a) a first lower blade and a second lower blade, positioned at a right angle with respect to each other;
   (b) rotatable eccentric shaft means;
   (c) a ram means pivotally mounted on said eccentric shaft means and pivotally movable about said shaft means for upwardly and downwardly moving with respect to said lower blades, said ram means including a first upper blade and a second upper blade, positioned at a right angle with respect to each other, wherein said ram means is movable towards and away from said first lower blade and said second lower blade for adjusting the horizontal clearance between said first upper blade and said first lower blade and the horizontal clearance betwen said second upper blade and said second lower blade; and
   (d) first adjusting means for adjusting the horizontal clearance between said first upper blade and said first lower blade, said first adjusting means including said rotatable eccentric shaft means, wherein the rotation of said eccentric shaft means alters the position of said ram means with respect to said first lower blade means and thereby the clearance between said first upper blade means and said first lower blade means.

5. A shearing machine as set forth in claim 4 including second adjusting means for adjusting the horiziontal clearance between said second upper blade and said second lower blade, said second adjusting means including biasing means for biasing said ram means away from said second lower blade means, and means for moving said ram means with or against the force of said biasing means to alter the position of said ram means with respect to the seciond lower blade means and thereby the clearance between said second upper blade means and said second lower blade means.

6. A shearing machine comprising:
   (a) a first lower blade and a second lower blade, positioned at a right angle with respect to each other;
   (b) a ram means movable upwardly and downwardly with respect to said lower blades, said ram means including a first upper blade and a second upper blade, positioned at a right angle with respect to each other, wherein said ram means is movable towards and away from said first lower blade and said second lower blade for adjusting the clearance between said first upper blade and said first lower blade and the gap between said second upper blade and said second lower blade; and
   (c) adjusting means for adjusting the clearance between said second upper blade and said second lower blade, said adjusting means including biasing means for biasing said ram means away from said second lower blade means, and means for moving said ram means with or against the force of said biasing means to alter the position of said ram means.

7. A shearing machine as set forth in claims 5 or 6 wherein said means for moving said ram means includes at least one first threaded member, at least one second threaded member for engaging said second threaded member and turning means coupled to said first threaded member for turning said first threaded member with respect to said second threaded member.

8. A shearing machine as set forth in claim 7 wherein said turning means comprises lever means connected to said first threaded member, rod means connected to said lever means, and a turning member coupled to said rod means, wherein the turning of said turning member moves said rod member which rotates said lever member and thereby rotates said first threaded member.

* * * * *